US008361581B2

(12) United States Patent
Tick et al.

(10) Patent No.: US 8,361,581 B2
(45) Date of Patent: Jan. 29, 2013

(54) MODULAR TEXTILE SYSTEM

(75) Inventors: Suzanne Tick, New York, NY (US); Terry Mowers, New York, NY (US)

(73) Assignee: Tandus Flooring, Inc., Dalton, GA (US)

( * ) Notice: Subject to any disclaimer, the term of this patent is extended or adjusted under 35 U.S.C. 154(b) by 527 days.

(21) Appl. No.: 12/478,126

(22) Filed: Jun. 4, 2009

(65) Prior Publication Data

US 2009/0304974 A1 Dec. 10, 2009

Related U.S. Application Data

(63) Continuation-in-part of application No. PCT/US2008/008468, filed on Jul. 10, 2008.

(60) Provisional application No. 61/130,990, filed on Jun. 5, 2008.

(51) Int. Cl.

| | |
|---|---|
| ***B32B 3/14*** | (2006.01) |
| ***B44C 1/28*** | (2006.01) |
| ***D05C 15/04*** | (2006.01) |

(52) U.S. Cl. ............. 428/44; 52/311.1; 428/47; 428/85; 428/88; 428/89; 428/434; 428/633

(58) Field of Classification Search .................... 428/48, 428/44, 47, 85, 88, 89, 434, 633; 52/311.1
See application file for complete search history.

(56) References Cited

U.S. PATENT DOCUMENTS

| | | | |
|---|---|---|---|
| 5,011,411 | A | 4/1991 | Loewy |
| 6,203,879 | B1 | 3/2001 | Desai |
| 6,908,656 | B2 | 6/2005 | Daniel et al. |
| 7,297,385 | B2 | 11/2007 | Daniel et al. |
| 7,350,443 | B2 | 4/2008 | Oakey et al. |
| 2007/0298382 | A1 | 12/2007 | Schilling |
| 2010/0330327 | A1 | 12/2010 | Oakey et al. |

FOREIGN PATENT DOCUMENTS

| | | | |
|---|---|---|---|
| JP | 2003 096654 | A | 4/2003 |
| WO | WO 03/103945 | A1 | 12/2003 |
| WO | WO 2009/148423 | A1 | 12/2009 |
| WO | WO 2009/149242 | A1 | 12/2009 |

OTHER PUBLICATIONS

International Search Report—PCT/US2008/008468.
Written Opinion—PCT/US2008/008468.
International Search Repoert—PCT/US2008/008468, filed Feb. 26, 2009, Tandus US.
Written Opinion—PCT/US2008/008468, filed Feb. 26, 2009, Tandus US
International Search Report—PCT/US2009/046225, fiiled Aug. 13, 2009, Tandus US, LLC.
Written Opinion—PCT/US2009/046225, filed Aug. 13, 2009, Tandus US, LLC.

*Primary Examiner* — Brent O'Hern
(74) *Attorney, Agent, or Firm* — Womble Carlyle Sandridge & Rice, LLP

(57) ABSTRACT

A modular textile system comprises a plurality of distinct, but coordinating, textile tiles, each including at least one design zone, where at least two of the distinct tiles include at least one design zone having substantially the same composition.

36 Claims, 10 Drawing Sheets

MODULAR TEXTILE SYSTEM

CROSS-REFERENCE TO RELATED APPLICATIONS

This application is a continuation-in-part of International Application No. PCT/US2008/008468, filed Jul. 10, 2008, which claims the benefit under 35 U.S.C. §119(e) of U.S. Provisional Application No. 61/130,990, filed Jun. 5, 2008, both of which are incorporated by reference in their entirety.

BACKGROUND

Modular textile systems, for example, carpet tiles, have been used in many floor covering applications due to their ease of installation. Some carpet tiles are designed with small and/or busy patterns to try to obscure the seams between adjacent installed tiles in an effort to have the resulting installation seem to resemble or mimic a broadloom carpet installation. In contrast, solids and more simple or classic design elements often are avoided, since such design elements tend to emphasize the modular nature of the carpet tile.

As such, there remains a need for a textile system that does not seek to mimic the appearance of a broadloom carpet installation and, instead, allows the designer and/or installer the freedom to create any desired overall pattern or aesthetic without being restricted to a particular arrangement of tiles or alignment of a pattern along seams. As a result, more simple patterns and/or solids may be used if desired.

SUMMARY

This disclosure is directed generally to a modular textile system, a method of making such a system, and a textile web or substrate used to form such a system. The modular textile system includes a plurality of distinct carpet tiles, each of which includes at least one design zone having a composition defined by a particular set of design elements, features, and/or parameters, for example, yarn type (e.g., color, luster, twist, number of plies, dye type, and so on), number of distinct yarn types, tufting specifications or parameters (e.g., texture, pattern, motif, relief (pile height), presence of accent elements, and so on), and/or any other suitable design element, feature, and/or parameter. At least one tile includes a design zone having a composition that is substantially similar to, and in some instances substantially the same as, the composition of a design zone of at least one other tile, so that the respective tiles coordinate with one another. The tiles may be installed or arranged in any manner desired by the user, without being required to match a pattern along seams or to align the tiles in a specific direction, for example, relative to the direction of the tufts. Thus, the modular textile system affords the user substantial flexibility and creative freedom to attain the overall aesthetic desired by the user.

In one particular example, the modular textile system includes a plurality of distinct textile tiles including a first tile, a second tile, and a third tile collectively including a plurality of design zones extending along a first dimension of the respective tile. The plurality of design zones includes a first pair of coordinating design zones defining a respective edge of the first tile and the second tile, and a second pair of coordinating design zones defining a respective edge of the second tile and the third tile. The first pair and second pair of coordinating design zones are distinct from one another. The first pair of coordinating design zones allow the first tile and the second tile to coordinate with one another, the second pair of coordinating design zones allow the second tile and the third tile to coordinate with one another, and the second tile serves as a coordinating bridge between the first tile and the second tile, so that all of the distinct tiles can coordinate with one another regardless of their relative position and/or orientation in an installation. The textile system can be used to create countless overall designs and/or patterns that users (e.g., purchasers or viewers) may, subject to their individual preferences, deem harmonious and visually appealing.

The modular textile system may be formed in any suitable manner, and in one example, the tiles are formed or derived from a unitary textile web. The width of the textile web includes a plurality of discrete design zones including a first design zone and a second design zone extending along the length of the textile web. The textile web is divided into a plurality of tiles including a first tile, a second tile, and a third tile substantially adjacent to one another across the width of the textile web. In doing so, the first design zone and the second design zone are each divided into a respective first portion and a respective second portion, with the first tile including the first portion of the first design zone, the second tile including the second portion of the first design zone and the first portion of the second design zone, and the third tile including the second portion of the second design zone.

Although some aspects of the invention are discussed in connection with tufted textiles, textiles formed using other suitable techniques also may be used.

Other features, aspects, and embodiments will be apparent from the following description and accompanying figures.

BRIEF DESCRIPTION OF THE DRAWINGS

The description refers to the accompanying drawings, some of which are schematic, in which like reference characters refer to like parts throughout the several views, and in which.

DETAILED DESCRIPTION

Figure 1A:
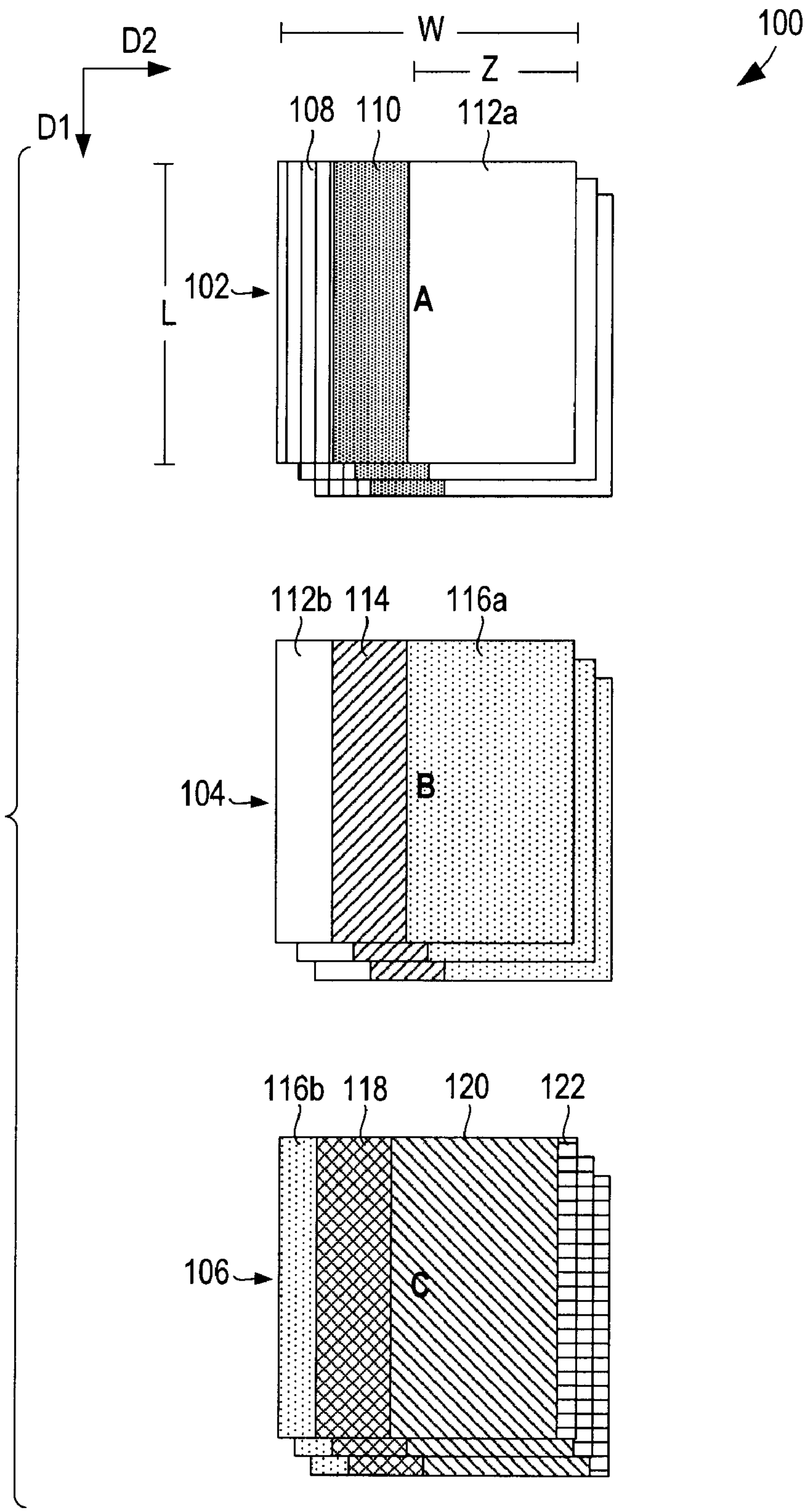
FIG. 1A schematically depicts an exemplary modular textile system including a plurality of distinct tiles.

FIG. 1A schematically depicts a modular textile system 100. The system 100 generally includes a plurality of textile tiles, each of which has a first dimension (e.g., a length) L extending in a first direction D1 and a second dimension (e.g., a width) W extending in a second direction D2 substantially perpendicular to the first direction. The system 100 includes at least a first tile 102, a second tile 104, and a third tile 106, each of which includes at least one tufting or design zone 108, 110, 112*a*, 112*b*, 114, 116*a*, 116*b*, 118, 120, 122 extending in the first direction D1 along the first dimension (e.g., length) L of the respective tile 102, 104, 106. Each design zone generally has a first dimension (e.g., length) L substantially equal to the first dimension (e.g., length) L of the respective tile, and a second dimension (e.g., width) Z (only one of which is labeled) extending in the second direction D2 along at least a portion of the second dimension (e.g., width) W of the respective tile 102, 104, 106.

Each design zone 108, 110, 112*a*, 112*b*, 114, 116*a*, 116*b*, 118, 120, 122 can be characterized as having a particular set of visual and/or tactile characteristics (collectively "sensory characteristics") (illustrated schematically in the figures with various fill patterns) that may be perceived by a user. The particular set of sensory characteristics associated with each zone generally results from the selection and/or combination of a plurality of design elements, features, and/or parameters, for example, yarn type (e.g., color, luster, twist, number of plies, dye type, and so on), number of distinct yarn types, tufting specifications or parameters (e.g., texture, pattern, motif, relief (pile height), presence of accent elements, and so on), and/or any other suitable design element, feature, and/or parameter. The particular combination of such design elements, features, and/or parameters defines an overall composition of each zone (or "zone composition").

In the illustrated example, the first tile 102 includes three distinct design zones 108, 110, 112*a* (i.e., design zones having a different composition) having various respective widths Z (only one of which is labeled), the second tile 104 includes three distinct design zones 112*b*, 114, 116*a* having various respective widths Z (not labeled), and the third tile 106 includes four distinct design zones 116*b*, 118, 120, 122 having various respective widths Z (not labeled). However, it will be understood that any tile 102, 104, 106 may include two or more design zones having a distinct composition, two or more design zones having a substantially identical composition, two or more design zones having a substantially similar composition, or any combination thereof. The differences between the zones may be more subtle or more prominent depending on the desired overall aesthetic to be achieved.

Each zone of each tile 102, 104, 106 may have any suitable width. Generally, each zone may encompass at least two stitch rows, and more typically, each zone includes several stitch rows, such that the resulting zone has a width of at least about 1 in. In each of various independent examples, for a tile having a length of about 24 in. and width of about 24 in, each zone may independently have a width of from about 1 in. to about 22 in., from about 3 in. to about 15 in., or from about 4 in. to about 8 in. In each of additional independent examples, each zone may independently have a width of about 1 in., about 2 in., about 3 in., about 4 in., about 5 in., about 6 in., about 7 in., about 8 in., about 9 in., about 10 in., about 11 in., about 12 in., about 13 in., about 14 in., about 15 in., about 16 in., about 17 in., about 18 in., about 19 in., about 20 in., about 21 in., or about 22 in. However, other numbers of tiles, numbers of zones, zone widths, and arrangements of design zones may be used.

The precise combination of design zones of a tile, the relative proportion of each design zone of the tile, and the arrangement or relative positions of the design zones of the tile collectively define an overall composition for each tile (or "tile composition"). In the example shown schematically in FIG. 1A, each tile 102, 104, 106 in the modular textile system 100 has a distinct composition, and therefore, a distinct set of resulting sensory characteristics from each other tile in the modular textile system. The differences between the tiles may be relatively subtle or more pronounced. Thus, for example, two tiles that are distinct may include one or more substantially identical design zones, with the dimensions and/or relative positions of one or more of such zones varied between the two tiles. Other pairs of distinct tiles may include no substantially identical design zones, different numbers of design zones, and/or different arrangements of design zones.

For a particular modular textile system, at least one design zone of at least one tile has a substantially similar composition to at least one design zone of another tile, and in some instances, substantially the same composition as at least design zone of another tile. Further, in some embodiments, at least one design zone of each tile has a substantially similar composition to at least one design zone of another tile, and in some instances, substantially the same composition as at least design zone of another tile. Such zones may serve as coordinating zones that provide a sensory connection between the respective tiles.

For the embodiment illustrated in FIG. 1A, at least one design zone of each of tiles 102, 104, 106 has a composition that is substantially the same as the composition of at least one design zone of at least one other tile 102, 104, 106. Tiles 102, 104 respectively include a first pair of coordinating zones 112*a*, 112*b*, and tiles 104, 106 respectively include a second pair of coordinating zones 116*a*, 116*b*. As a result, tiles 102, 104 tend to coordinate (i.e., match or "go with") with one another and tiles 104, 106 tend to coordinate with one another. Further, since tile 104 coordinates with both tile 102 and tile 106, tile 104 may serve as a coordinating "bridge" or "link" that creates continuity between tiles 102, 106, even if there are no design zones on tiles 102, 106 that have substantially the same composition. Thus, the use of the "bridging" tile 104 allows all of the tiles 102, 104, 106 to coordinate with one another. It is noted that in this example, the various coordinating zones 112*a*, 112*b*, 116*a*, 116*b* abut and/or define edges of the respective tile extending in the first direction D1. However, the coordinating zones may be configured differently if desired. In some embodiments, the coordinating zones may be substantially identical to one another, in that their sensory (i.e., visual and/or tactile) characteristics are substantially identical to one another (irrespective of zone width). However, in other embodiments, the coordinating zones may differ in appearance, as will be discussed in greater detail in connection with FIGS. 2A-3C. Nonetheless, there is generally a sufficient visual connection between the zones that it would be apparent to a user that such zones are intended to coordinate with one another.

Figure 1B:
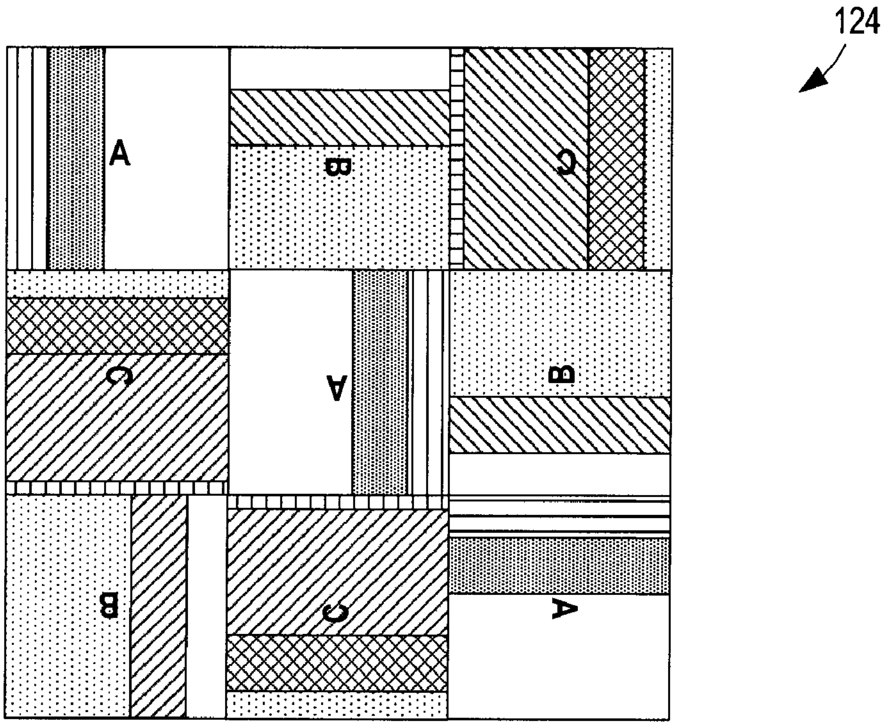
FIGS. 1B and 1C schematically depict exemplary installations using the textile system of FIG. 1A.
Figure 1C:
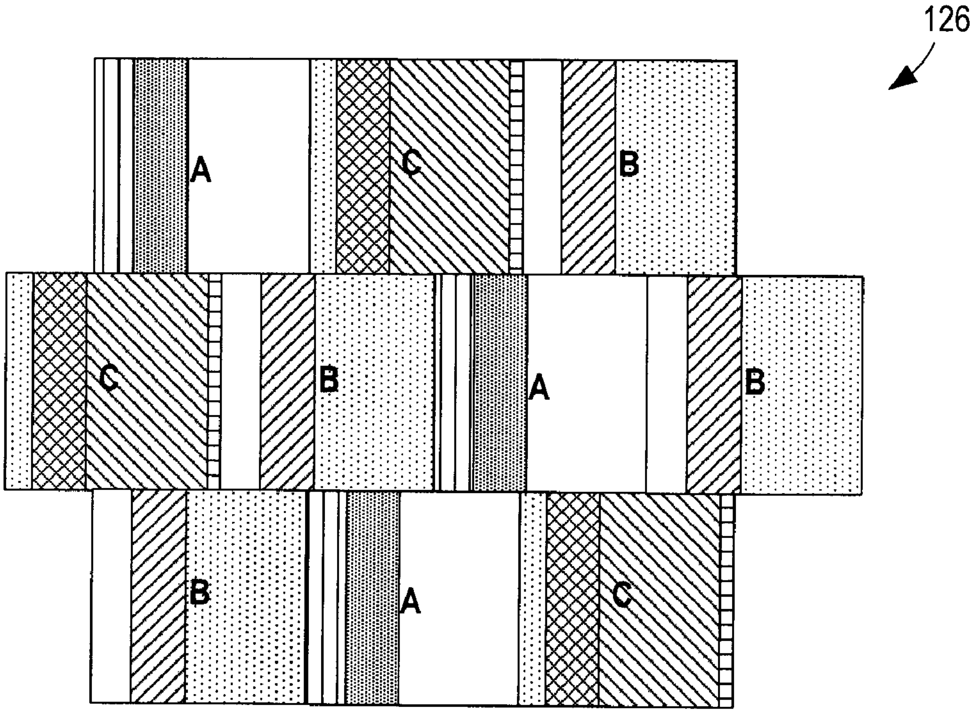

FIG. 1B illustrates an exemplary installation 124 including a plurality of each of the carpet tiles 102, 104, 106 of FIG. 1A. For purposes of illustration and not limitation, each type of tile 102, 104, 106 is labeled respectively as tile A, B, C. In this exemplary installation, equal quantities of tiles A, B, C are placed in a side by side, block repeat arrangement with the edges of adjacent tiles aligned with one another. The arrangement of tiles may appear to be "non-directional," that is, the tiles may appear to be randomly oriented with respect to the other tiles in the array. Despite this seemingly arbitrary placement of tiles, the overall arrangement of tiles A, B, C may be deemed visually harmonious by users because the tiles coordinate with one another. In another exemplary installation 126 shown in FIG. 1C in which the tiles are arranged in a horizontal ashlar or brick configuration, the arrangement of tiles may appear to be "directional," that is, the tiles may appear to be oriented in a particular manner. In this example, even though the design zones are not aligned with one another (for example, to form a plurality of substantially continuous bands or stripes), the overall installation may be considered to be cohesive and harmonious (rather than disjoined or irregular) because the tiles coordinate with one another.

It will be evident that there are countless possible arrangements of tiles, each of which may provide a different overall aesthetic or impression, and that the various non-directional and directional appearances may be achieved using a variety of installation methods. Such installations may be monolithic, quarter-turn, half-turn, horizontal or vertical ashlar, random, or any other suitable method or configuration. Of course, it will be understood that whether a particular arrangement of tiles is acceptable or desirable (e.g., visually pleasing or harmonious) is subjective, based on a user's individual taste and preferences. Thus, the tiles may be repositioned, reoriented, or otherwise manipulated as needed to achieve the desired overall "look" sought by a particular user.

Figure 1D:
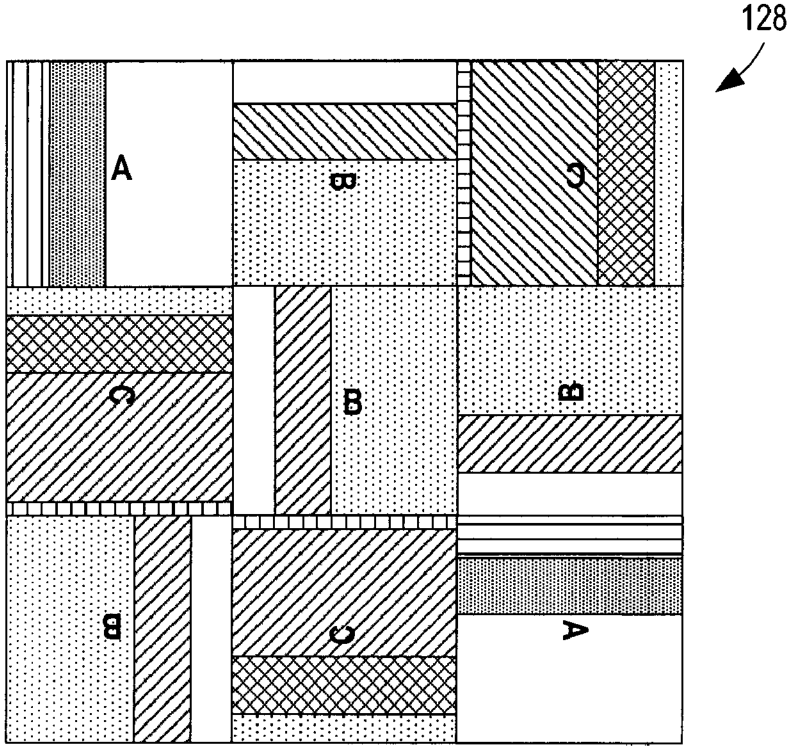
FIGS. 1D and 1E schematically depict variations of the installation of FIG. 1B.
Figure 1E:
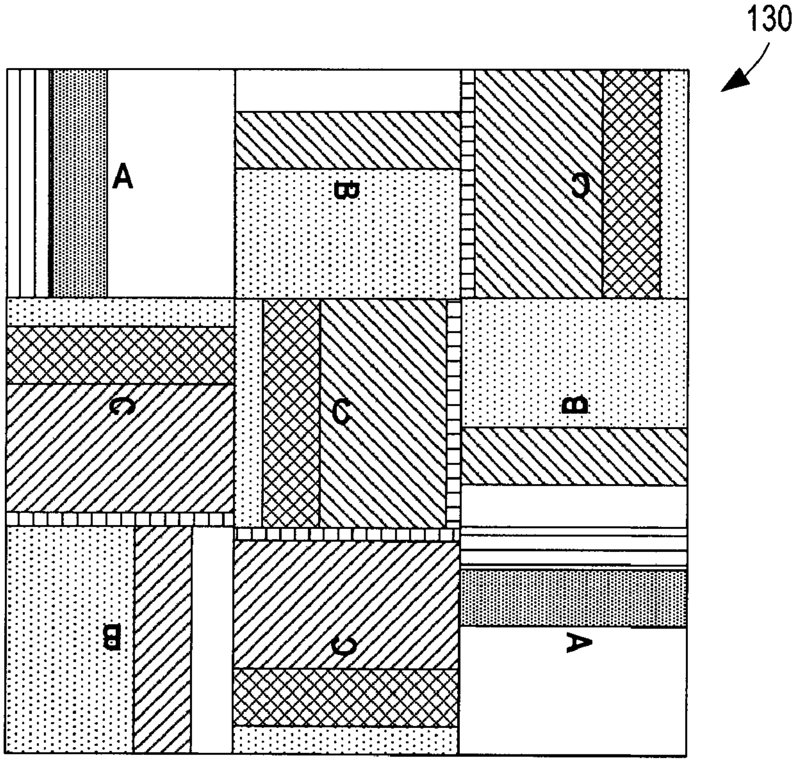

The freedom to arrange the tiles without being constrained by the need to match a pattern across seams or account for tufting direction may greatly simplify both the initial installation of tiles and replacement of one or more damaged and/or worn tiles. Further, since the colors may vary between tiles A, B, C, the user need not be as concerned with variations between adjacent tiles, for example, when replacing a tile in a pre-existing installation. By way of example, FIGS. 1D and 1E schematically depict the arrangement of tiles of FIG. 1B in which the center tile (type A) has been replaced with tile B and tile C, respectively. Although the resulting installations 128, 130 in FIGS. 1D and 1E differ slightly from the original installation shown in FIG. 1B, the respective arrangements of the A, B, C tiles may nonetheless be considered harmonious and visually pleasing, depending on the preferences of a particular user.

If desired, to simplify installation even further, the modular textile system 100 may be packaged to include an equal number of tiles A, B, C in each carton. For example, a carton may include 12 tiles including four each of tile A, B, C. The tiles also may be arranged within the package in a collated stack, for example, with tiles A, B, C, A, B, C, and so on (or B, C, A, B, C, A, or any other desired collation). By packaging the tiles in this manner, the user may remove the tiles from the carton and install them sequentially, positioning and orienting the tiles as desired to create an overall design according to a user's preferences. Alternatively, tiles A, B, C may be packaged separately to give the user the creative freedom to acquire and install tiles A, B, C in any proportion and/or manner to create a more customized installation according to the user's preferences.

Figure 1F:
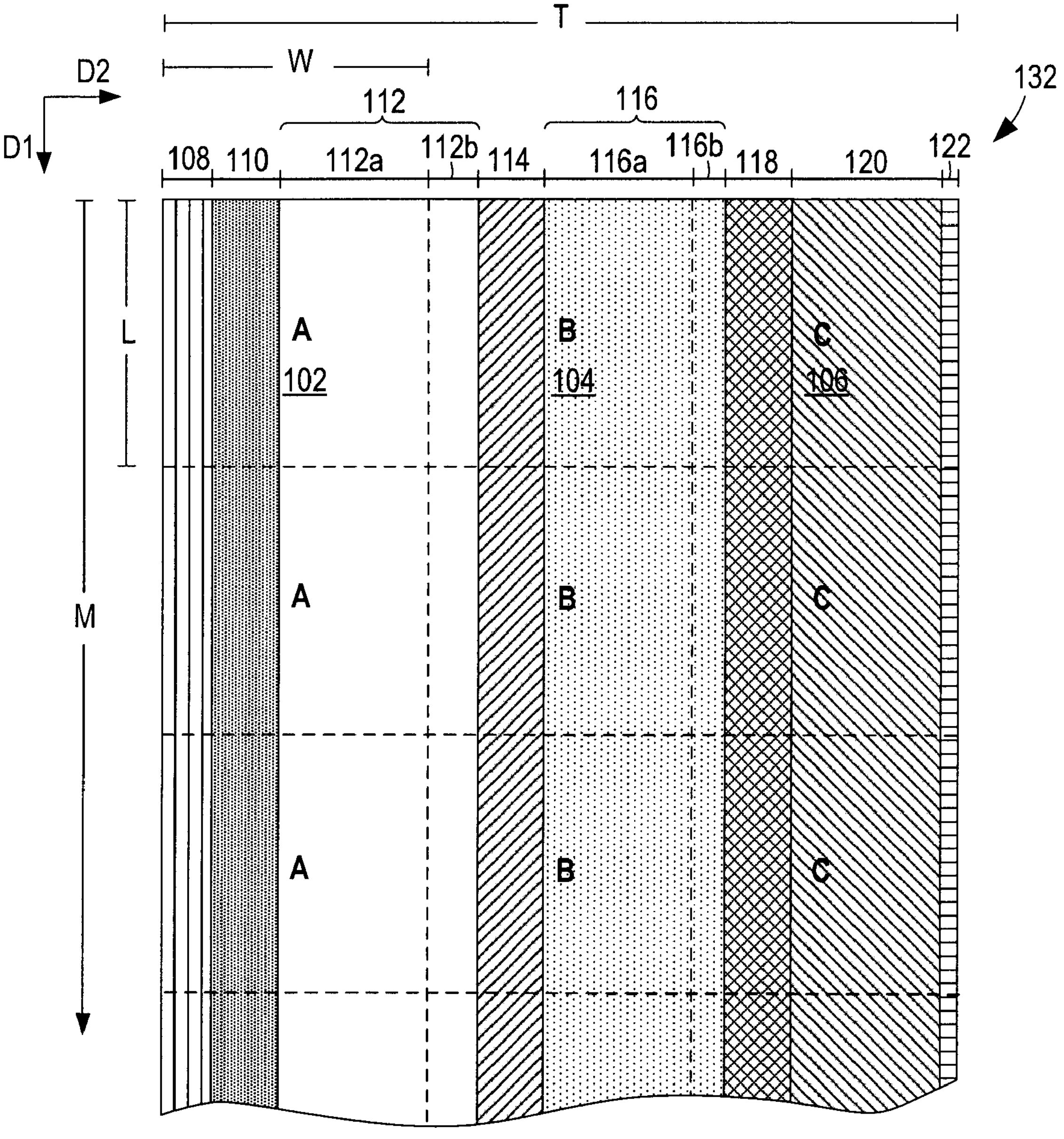
FIG. 1F schematically depicts an exemplary textile web that may be used to form the modular textile system of FIG. 1A.

FIG. 1F schematically depicts an exemplary method of forming the modular textile system 100 of FIG. 1A. In this example, a unitary textile web 132 is used to form a plurality of distinct, but coordinating, tiles 102, 104, 106, as discussed above. However, other methods of making the modular textile system are contemplated.

The textile web 132 includes a first dimension M (e.g., a length) extending in a lengthwise, machine direction D1, and a second dimension T (e.g., a width) extending in a transverse direction D2. The width T of the textile web 132 is divided into plurality of substantially discrete design zones 108, 110, 112, 114, 116, 118, 120, 122 (schematically illustrated using various fill patterns) extending in the machine direction D1 along the length M of the textile web 132. Each zone may have any suitable width. For instance, in each of various independent examples, for a textile web having a width of about 80 in., each zone may independently have a width of from about 1 in. to about 44 in., from about 2 in. to about 36 in., from about 6 in. to about 30 in., or from about 8 in. to about 16 in. However, other zone widths and ranges of zone widths are contemplated.

As discussed above, each design zone 108, 110, 112, 114, 116, 118, 120, 122 may be formed using a plurality of design elements, features, and/or parameters, any of which may vary from zone to zone. The differences in the composition of each zone may be subtle or more apparent, depending on the desired overall aesthetic to be achieved. For example, if desired, the various zones may be formed from yarns having a single color or multiple colors, as needed to provide the desired overall composition of each tile and the desired overall aesthetic of the installed modular tile system (FIGS. 1B-1E). Further, the relative colors of the zones may be selected to provide a range of warmer and cooler tones in the resulting tiles. For example, the zones of the textile web 132 may be configured so that a first tile includes a design zone having a color that is cooler than the color of a design zone of a second tile, which may be cooler than a color of a design zone of a third tile, such that the third tile includes the warmest color. Numerous other possibilities are contemplated.

The textile web 132 may be apportioned or divided into a plurality of tiles as shown schematically in FIG. 1F with dashed lines. In this example, the textile web 132 is divided into three substantially square tiles 102, 104, 106 substantially adjacent to one another across the width T of the textile web 132. At least one design zone, and in this example, two design zones 112, 116, are divided into a respective first portion 112*a*, 116*a* and a respective second portion 112*b*, 116*b*, such that zone 112 is shared between tiles 102, 104 and zone 116 is shared between tiles 104, 106, as discussed in connection with FIG. 1A. Specifically, tile 102 includes the first portion 112*a* of design zone 112 and the tile 104 includes the second portion 112*b* of design zone 112. Similarly, tile 104 includes the first portion 116*a* of design zone 116, and tile 106 includes the second portion 116*b* of design zone 116. Design zones 112, 116 may be divided into equal or unequal portions, such that the respective pairs of partial zones 112*a*, 112*b* and 116*a*, 116*b* may have equal or unequal widths. As discussed in connection with FIG. 1A, zones 112*a*, 112*b* and 116*a*, 116*b* serve as coordinating zones for the tiles 102, 104, 106. The remaining zones 108, 110, 114, 118, 120, 122 may be independent or distinct zones.

The length M of the textile web 132 also may be divided (i.e., cut) into a plurality of tiles similar to tiles 102, 104, 106. For purposes of illustration, each tile in the leftmost position (e.g., tile 102) may be designated as an "A" tile, each tile in the medial position (e.g., tile 104) may be designated as a "B" tile, and each tile in the rightmost position (e.g., tile 106) may be designated as a "C" tile. Each tile A has substantially the same composition as each other tile A, each tile B has substantially the same composition as each other tile B, and each tile C has substantially the same composition as each other tile C. However, in some embodiments, one or more design zones may differ in appearance from tile to tile, such that each tile cut along the length of the web may not be exactly identical in appearance to each other tile of the same type (i.e., within the same position, e.g., tile A, tile B, tile C). Further, as stated previously, each pair of coordinating zones may not be identical in appearance. For example, the coordinating zones may have slightly different appearances caused by variability in the tufting process, may have somewhat different configurations of patterns or motifs (where present), and/or may include one or more additional design features or elements, as will be discussed in detail below.

For example, FIGS. 2A-3C depict various textile webs, modular textile systems, and modular textile installations in which the coordinating zones and/or tiles of a particular type differ in appearance. The various textile webs, modular textile systems, and modular textile installations include features that are similar to those shown in FIGS. 1A-1F, except for variations noted and variations that will be understood by those of skill in the art. For simplicity, the reference numerals of similar features are preceded in the figures with a “2” (FIGS. 2A-2C) or “3” (FIGS. 3A-3C) instead of a “1.” It will be noted that the number of zones, arrangement of zones, width of each zone, and so on, may vary in each embodiment, and that the illustrated embodiments are not intended to be limiting in any manner.

Figure 2A:
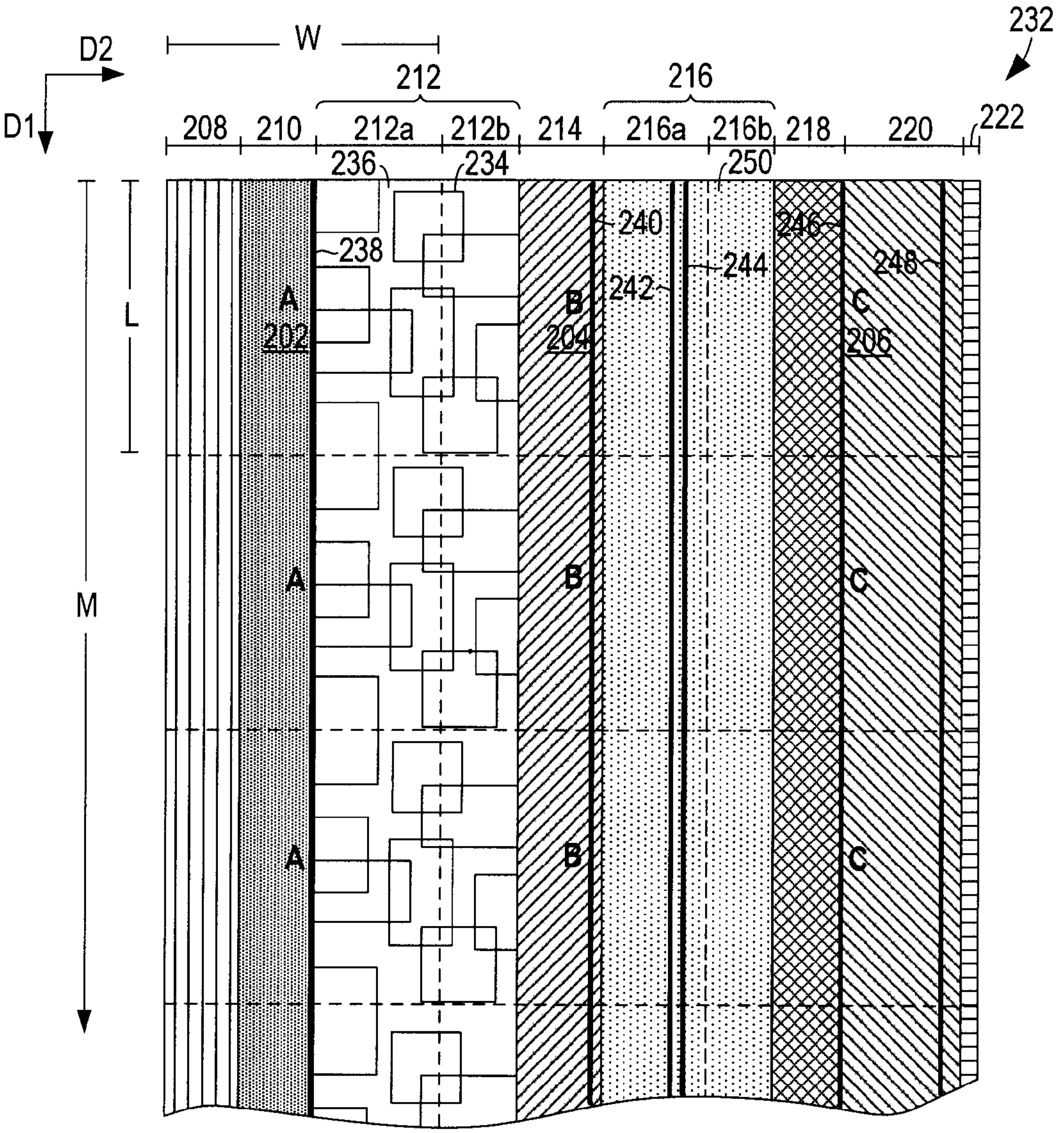
FIG. 2A schematically depicts another exemplary textile web that may be used to form a modular textile system.

In the embodiment illustrated in FIG. 2A, zone 212 includes a design element or motif 234 comprising a plurality of rectangles and squares, some of which overlap with one another. However, any suitable motif may be used in accordance with the disclosure. The motif may be simple or complex, subtle or prominent, and may include colors consistent with and/or contrasting with the remaining colors of the modular textile system. For example, the background of the zone may have a color consistent with the remaining zones, while the motif may have a more prominent color relative to the background. Alternatively, the motif may have a color consistent with the remaining zones, while the background may have a more prominent color. By way of illustration, the background 236 of the zone 212 and the various other design zones 208, 210, 214, 216, 218, 220, 222 may comprise various shades of brown, while the motif 234 may be red or another color that is visually prominent against the brown palette of the remaining zones. Alternatively, the motif 234 and the various other design zones 208, 210, 214, 216, 218, 220, 222 may comprise various shades of brown, while the background 236 of zone 212 may comprise red or another color that is visually prominent against the brown palette of the remaining zones and the motif. In other examples, both the motif and background of the particular zone may have a color consistent with the other zones. In still other examples, both the motif and background of the particular zone may have a more prominent color than the other zones. Numerous possibilities are contemplated.

Figure 2B:
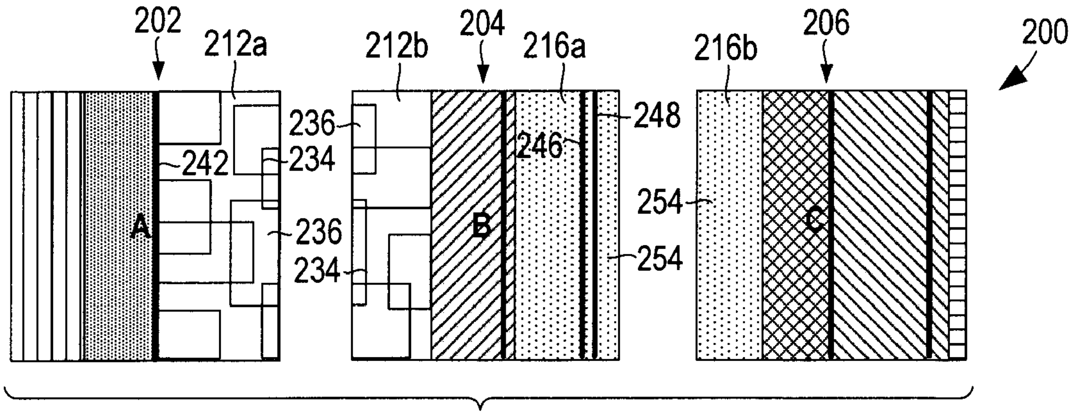
FIG. 2B schematically depicts an exemplary modular textile system including a plurality of distinct tiles formed from the textile web of FIG. 2A.

It will be appreciated that where the zone including the motif is a shared zone, the resulting coordinating zones may differ slightly in appearance from one another, despite having substantially the same composition. The degree to which the respective portions of the shared zone differ in appearance may depend on numerous factors including, but not limited to, the arrangement of zones across the textile web, the width of each zone, the size, shape, and configuration of the motif within the zone, the length and width of the repeat unit of the motif, and the size of the tiles cut from the textile web. For example, since the motif 234 of FIG. 2A is not symmetrical along the boundary between the first and second tiles 202, 204 (i.e., along the dashed line), the resulting coordinating zones 212*a*, 212*b* may include a different arrangement of squares and rectangles, as shown in FIG. 2B. However, such zones 212*a*, 212*b* may still serve as coordinating zones because there is sufficient similarity between the zones to create a sensory connection between the tiles 202, 204.

In some embodiments, the motif may lie entirely within one tile of the pair of tiles including the shared zone, such that the resulting coordinating zones of the tiles may differ substantially in appearance. For example, in the embodiment shown in FIG. 3A, the textile web 332 includes a motif 334 comprising a curved line of varying width, portions of which generally resemble a blade. When the textile web 332 is cut into tiles 302, 304, 306 (FIG. 3B), the entirety of the motif 334 lies within zone 312*a* of tile 302 against a background 336, while zone 312*b* of tile 304 comprises only the background 336. Nonetheless, since the background 336 of each zone 312*a*, 312*b* has substantially the same composition, and since zones 312*a*, 312*b* have a substantially similar overall composition, there is a sufficient visual connection between the backgrounds of the zones that it would be apparent that the zones are intended to coordinate with one another.

Figure 3A:
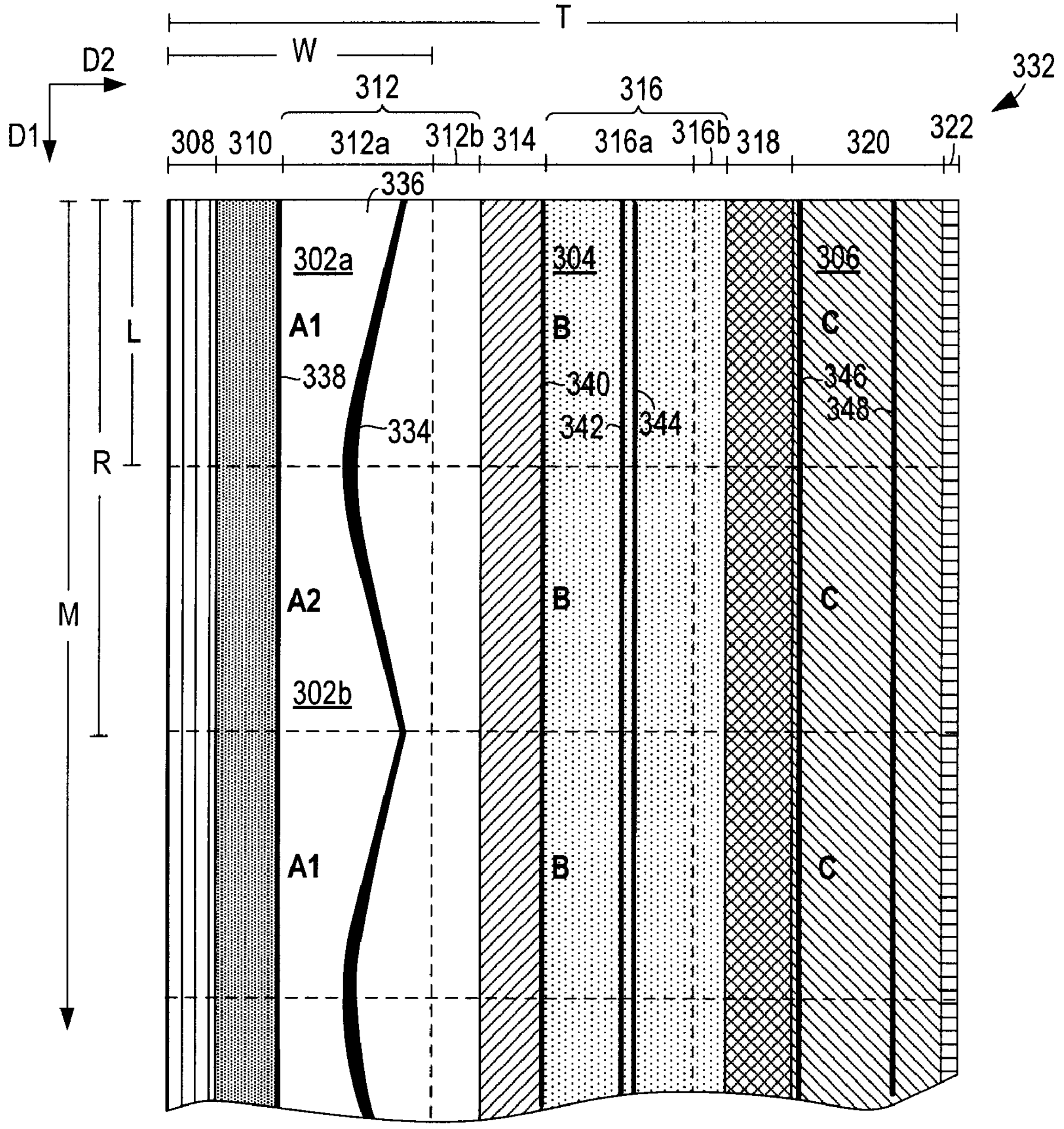
FIG. 3A schematically depicts still another exemplary textile web that may be used to form a modular textile system.
Figure 3B:
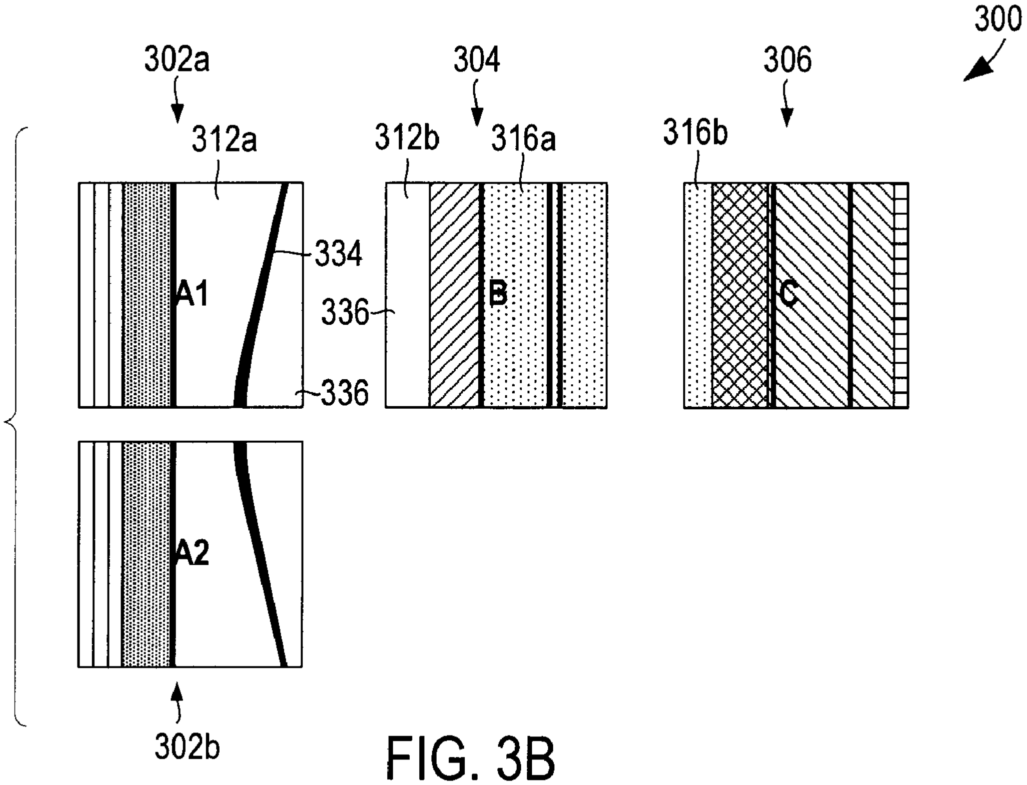
FIG. 3B schematically depicts an exemplary modular textile system including a plurality of distinct tiles formed from the textile web of FIG. 3A.

In some instances, it may be desirable to enhance the visual connection between tiles having coordinating zones that differ significantly in appearance, such as described above with respect to zones 312*a*, 312*b* of FIG. 3B. According to one exemplary method, the color of the motif may be incorporated into the background of the shared zone, for example, by adjusting the tufting heights of the yarns in the background to provide the background with a mottled color profile including the motif color. The presence of the motif color in the background may provide an additional sensory connection and/or may strengthen other sensory connections between the zones. For example, where the motif 334 is purple, the background 336 may be tufted to include purple blended with the other background color(s). The presence of purple in both the motif 334 and background 336 creates continuity between the motif 334 and background 336, and therefore, between the zones 312*a*, 312*b*.

It also will be appreciated that depending on the motif selected and the length of the repeat unit of the motif, the appearance of a particular zone may differ from tile to tile. For example, in the embodiment illustrated in FIG. 3A, the repeat unit R of the motif 334 spans the length of two tiles 302*a*, 302*b*. As a result, the modular textile system 300 includes two visually distinct A tiles A1, A2 (FIG. 3B). Nonetheless, it will be apparent to a viewer that the modular textile system 300 generally includes three types of tiles, even though each tile including the motif 334 (i.e., the A tiles) may not be exactly identical in appearance.

If desired, any of the tiles may be provided with one or more additional design elements or features having a more prominent appearance. Any number, shape, and arrangement of such elements may be used as needed to achieve the desired visual impression or effect. For example, the additional design element may comprise a band, a stripe, a pair of parallel lines, a squiggle, a scroll, a wave, a curve, or any other suitable shape. Such elements may be used to alter the aesthetic of the textile system, to facilitate coordination of tiles, or for any other suitable purpose.

For example, in the embodiment shown in FIG. 2A, a plurality of accent stripes 238, 240, 242, 244, 246, 248 extend along the length M of the textile web 232 within zones 210, 214, 216, 218, 220. (It will be noted that the embodiment shown in FIGS. 3A-3C includes similar accent stripes 348, 350, 352, 354, 356, 358, not discussed separately herein.) Each of the accent stripes may have a color that differs from the remainder of the respective zone, such that the accent stripe serves as a contrasting (or “contrast”) element or feature within the respective zone (and/or relative to the other zones of the modular textile system). By way of example, the accent stripes 238, 240, 242, 244, 246, 248 may be red, yellow, white, black, blue, green, violet, or any other suitable color, while the remainder of the textile web 232 may generally include a range of earth tones. Alternatively, the accent stripes may generally have the same hue as the remainder of the zone, but a different color (i.e., a different value or saturation), such that the presence of the accent stripes is more subtle.

In the illustrated embodiment, the accent stripes are positioned so that when the textile web 232 is cut into tiles, tile 202 has one accent stripe 238, tile 204 has three accent stripes 240, 242, 244, and tile 206 has two accent stripes 246, 248. At least some of the accent stripes of different tiles have substantially the same color, such that each tile coordinates with each other tile. In one embodiment, the accent stripes on the various tiles may be configured as follows:

tile 202 =accent stripe 238 (color 1);

tile 204 =accent stripe 240 (color 2), accent stripe 242 (color 3), and accent stripe 244 (color 1); and tile 206 =accent stripe 246 (color 4) and accent stripe 248 (color 3), where colors 1, 2, 3, and 4 may be any suitable color. In this manner, accent stripe 238 of tile 202 matches one accent stripe 244 of tile 204, and one accent stripe 242 of tile 204 matches one accent stripe 248 of tile 206. Since tile 204 includes accent stripes having the same color as accent stripes of both tiles 202, 206, the accent stripes of tile 204 may provide additional continuity between tiles 202, 206, thereby enhancing the bridging capability of tile 204. However, other arrangements of such elements may be used.

Where such design elements are used in a shared zone of the textile web, in some embodiments, the design element may lie entirely within one tile, such that the resulting coordinating zones differ in appearance. By way of example, in FIGS. 2A and 2B, accent stripes 242, 244 lie entirely within zone 216*a* of tile 204 against a background 250, while zone 216*b* of tile 206 comprises only background 250. Nonetheless, since such zones are substantially similar in composition and appearance, the zones may still serve as coordinating zones because it would be apparent to a user that such zones are intended to coordinate with one another.

Figure 2C:
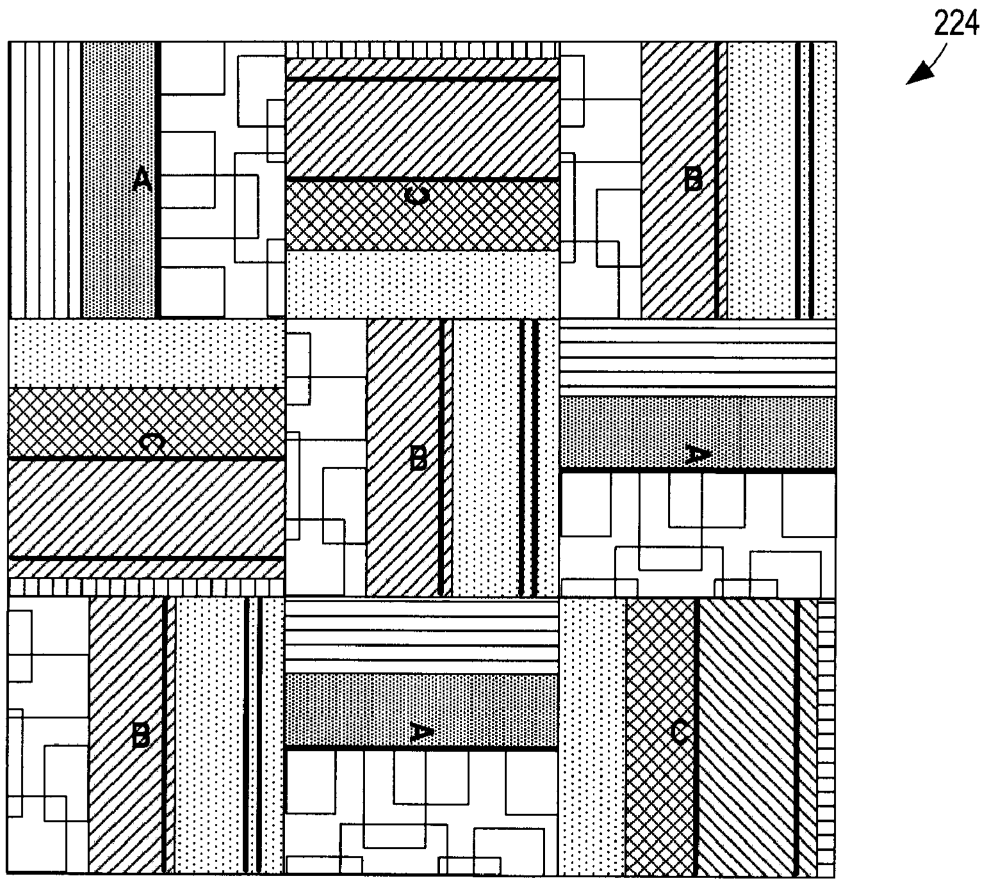
FIG. 2C schematically depicts an exemplary installation using the textile system of FIG. 2B.
Figure 3C:
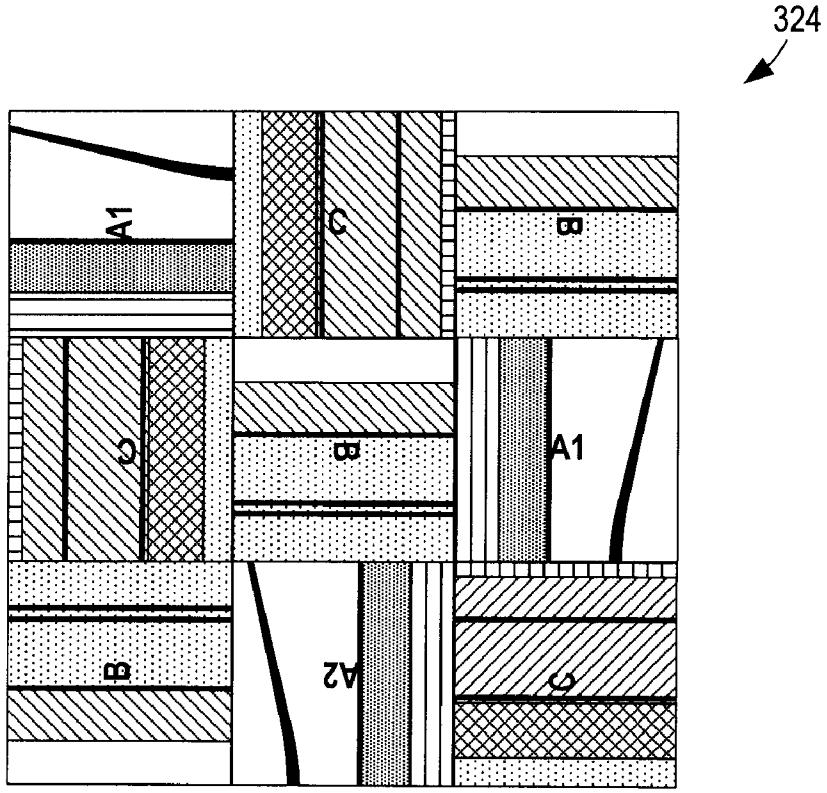
FIG. 3C schematically depicts an exemplary installation using the textile system of FIG. 3B.

It will be appreciated that the presence of design elements (for example, patterns, motifs, contrast elements, or other design elements), and/or variations in coordinating zones may provide a new visual "dimension" to the modular textile system, while maintaining continuity between the various distinct tiles throughout the installation, as illustrated schematically in the exemplary installations 224, 324 of FIGS. 2C and 3C. Furthermore, the modular textile system of the present disclosure allows the designer to use patterns or motifs that might otherwise be overwhelming in a typical broadloom installation. For example, if motif 234 was repeated continuously across the length and width of a textile web, the overall appearance of the installation might be perceived as being too "busy" by some viewers. However, when the same motif 234 is used in accordance with the modular textile system of the present invention, the somewhat segmented appearance of the motif 234 is more subtle and restrained, and in some cases, may advantageously resemble a decorative inlay.

Figure 4A:
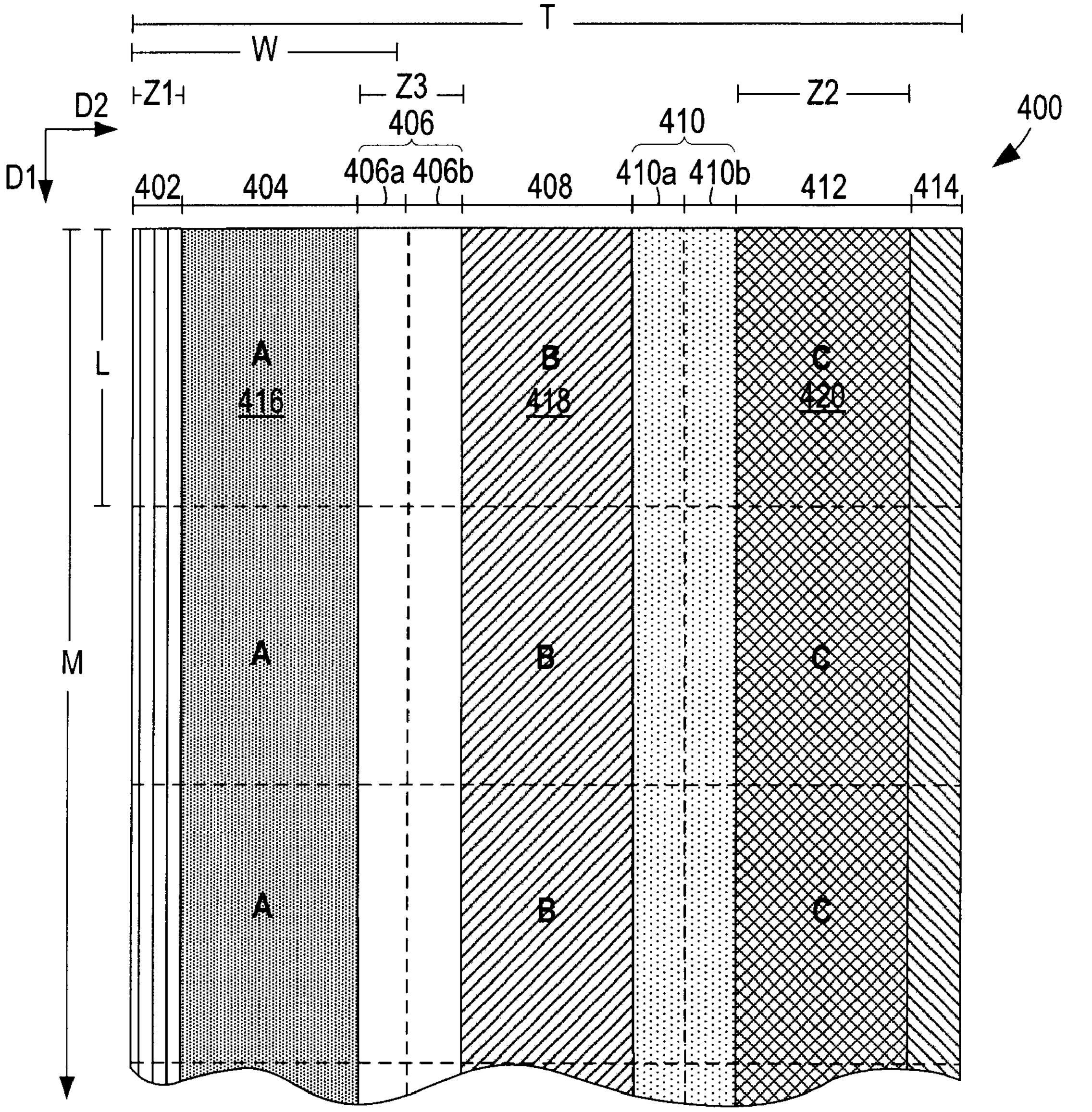
FIG. 4A schematically depicts yet another exemplary textile web that may be used to form a modular textile system.
Figure 4B:
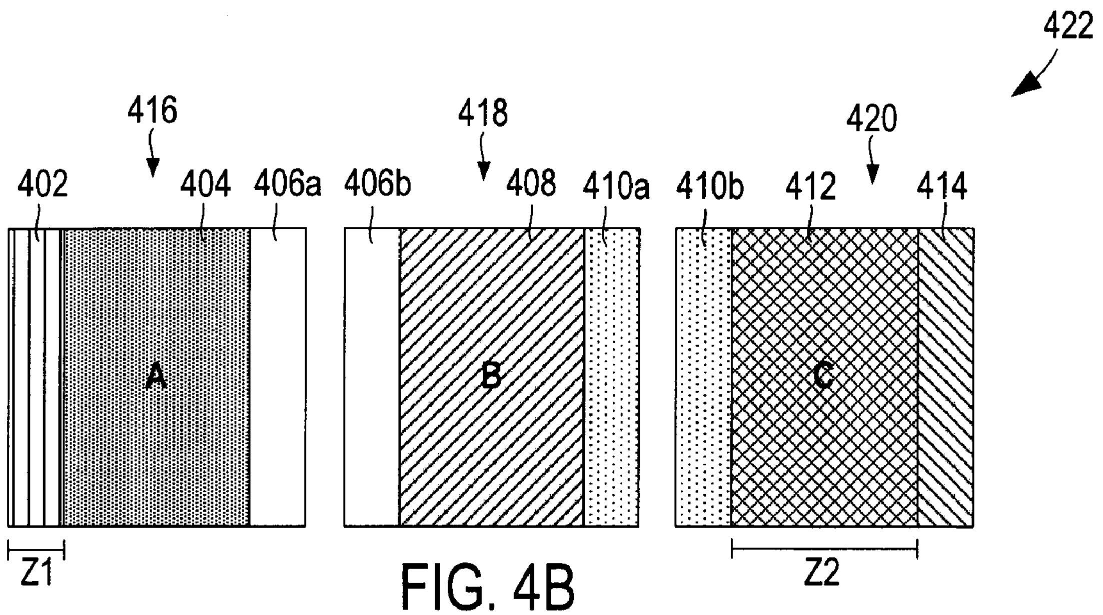
FIG. 4B schematically depicts yet another exemplary modular textile system including a plurality of distinct tiles formed from the textile web of FIG. 4A.

In each of the above examples, the arrangement of zones on each tile and on the textile web is asymmetrical. However, symmetrical arrangements may be used if desired. For example, FIG. 4A illustrates a textile web 400 including a plurality of design zones arranged so that the resulting tiles each include a substantially symmetrical arrangement of zones. Specifically, the width T of the textile web 400 is divided into seven discrete design zones 402, 404, 406, 408, 410, 412, 414 extending in the machine direction along the length M of the textile web 400. Zones 402, 414 are substantially equal in width Z1, zones 404, 408, 412 are substantially equal in width Z2, and zones 406, 410 are substantially equal in width Z3 (approximately two times width Z1), such that each tile 416, 418, 420 of a three tile system 422 (FIG. 4B) includes a design zone 404, 408, 412 having a width Z2 centered along the width of the respective tile 416, 418, 420, and two respective edge zones 402, 406*a*, 406*b*, 410*a*, 410*b*, 414 having a width Z1 disposed on each side of the respective center zone 404, 408, 412.

Figure 4C:
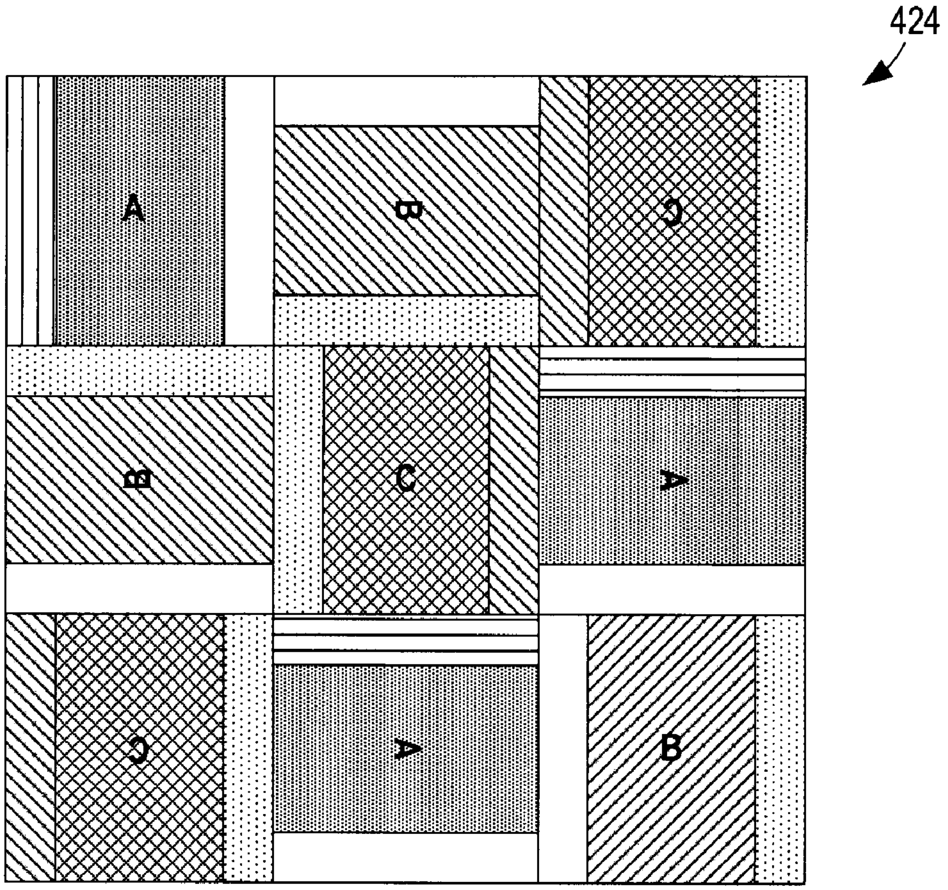
FIG. 4C schematically depicts an exemplary installation using the textile system of FIG. 4B.

The tiles 416, 418, 420 may be installed in any suitable manner, as described above. In one exemplary non-directional installation 424 shown in FIG. 4C, the arrangement of tiles resembles a basket weave. However, other configurations are contemplated. Further, in other embodiments, the tiles 416, 418, 420 may include one or more design elements or features (e.g., motifs or other elements), as needed to achieve the desired aesthetic of the modular textile system 422.

Some aspects of the disclosure may be illustrated with reference to the following example, which is not to be construed as limiting in any manner.

EXAMPLE 1

Various modular textile systems similar to the system 100 of FIG. 1A were prepared in different colorways (i.e., color schemes) according to the method described in connection with in FIG. 1F. The textile web was about 72 inches (about 1.83 m) wide. The width of the textile web was cut into three tiles, each having a width of about 24 in. (about 0.6 m) and a length of about 24 in. (about 0.6 m).

For each colorway used, the design zones may be characterized as follows:

108—highly textured, about 4.75 in. (about 0.121 m) in width

110—high relief, tip shear, about 6.375 in. (about 0.162 m) in width

112—pinstripe pattern, about 17.5 in. (about 0.33 m) in width

114—high relief, tip shear, about 6.125 in. (about 0.156 m) in width

116—"tweed" style level loop weave, about 17.5 in. (about 0.445 m) in width

118—high relief, high luster yarn, tip shear, about 6.4375 in. (about 0.164 m) in width

120—"sisal" style weave, about 11.625 in. (about 0.295 m) in width

122—highly textured, about 1.875 in. (about 0.048 m) in width

When cut into tiles, zone 112*a* had a width of about 13 in. (about 0.33 m), zone 112*b* had a width of about 4.5 in. (about 0.114 m), zone 116*a* had a width of about 13.25 in. (about 0.337 m), and zone 116*b* had a width of about 4.25 in. (about 0.108 m).

Additionally, tile type A was formed using cooler colors, tile type C was formed using warmer colors, and tile type B was formed using colors between those of tiles A and C. The tiles were installed using various techniques to form numerous different overall designs.

It will be noted that although the above discussion is directed to modular textile systems including three distinct tile designs, other numbers of tile designs are contemplated. Thus, a system may include two, three, four, five or any other suitable number of distinct tile styles. In such systems, numerous other packaging techniques may be used to facilitate installation and/or to assist the installer with creating a desired aesthetic.

Further, it will be understood that numerous other methods may be used to form a modular textile system in accordance with the disclosure. For example, a textile web could be provided with a plurality of one type of tile (e.g., A, B, or C) repeated across the web, which may be cut into tiles accordingly. In such a method, the number of distinct tiles generally may equal the number of webs (e.g., three distinct tiles, three textile webs). In another example including four distinct tiles, two or more webs may be used to create each tile type. For example, one textile web could be used to prepare tile types A and B, while another is used to prepare tile types C and D. The tiles then may be collated or assembled and provided to a user as desired. Countless other possibilities are contemplated hereby.

It also will be noted that any of the various textile webs described herein or contemplated hereby may be used as a roll good, alone or in combination with tiles. Since the textile web includes numerous design zones and design elements, the resulting installation may have a multi-dimensional appearance typically only achieved conventionally using custom design, manufacturing, and/or installation techniques.

It will be appreciated that any of the various textile systems may be displayed or presented alone or in combination with other textile systems (e.g., as part of a textile collection). For example, one or more textile systems may be displayed or presented in a book or binder including any combination of actual carpet samples or specimens, images of carpet samples, photographs of the carpet tiles in use, and/or any other product information that may be reviewed by a potential purchaser.

Since each textile system includes a plurality of distinct tiles, it will be appreciated that a display including actual textile specimens may be more cumbersome than a display with only one distinct tile style. This is particularly true where a collection of textile systems is presented, for example, where a particular style is offered in multiple color schemes. In such an instance, it may be beneficial to prepare specimens that are smaller in size than would typically be used. Such specimens may be formed from a scaled down version of the textile web, such that the relative proportion of each design zone and design element is retained within the sample. In this manner, a potential purchaser can view the entire textile system in one or more color schemes without the need for an excessively bulky book or binder of samples.

Alternatively or additionally, the presentation or display may include one or more “virtual” samples. A virtual sample is a substantially accurate image or representation printed onto or otherwise presented on a tangible medium, for example, paper, as described in U.S. Patent Application Publication No. US 2007-0298382 A1, published Dec. 27, 2007, which is incorporated by reference herein in its entirety. A plurality of virtual samples may be provided for each tile style and/or color scheme so that one or more samples may be removed without rendering the presentation incomplete. Such samples may be used to simulate various arrangements of the distinct tiles, to envision various installation techniques, or for any other suitable purpose.

It will be readily understood by those persons skilled in the art that, in view of the above disclosure, the present invention is susceptible of broad utility and application. Although specific embodiments or aspects are disclosed, it will be understood that this disclosure is only illustrative and exemplary of the invention and is made merely for purposes of providing a full and enabling disclosure of the invention and to set forth the best mode of practicing the invention known to the inventors at the time the invention was made. It will also be understood that what is aesthetically or visually pleasing or desirable is an inherently subjective proposition that will vary from person to person, depending on his or her individual tastes, so that no single arrangement contemplated by this invention will necessarily achieve an appearance desired or appreciated by all.

Many adaptations, variations, modifications, and equivalent arrangements will be apparent from or reasonably suggested by the present invention and the above detailed description thereof without departing from the substance or scope of the present invention. It will be recognized that various elements discussed with reference to the various embodiments may be interchanged to create entirely new embodiments coming within the scope of the invention. Accordingly, all matter contained in the above description or shown in the accompanying drawings shall be interpreted as illustrative only and is not intended nor is to be construed to limit or otherwise to exclude any such other embodiments, adaptations, variations, modifications, and equivalent arrangements of the present invention.

What is claimed is:

1. A modular textile system, comprising:

a plurality of distinct textile tiles including a first tile, a second tile, and a third tile, the first tile, second tile, and third tile each having a first dimension extending in a first direction and a second dimension extending in a second direction substantially perpendicular to the first direction, wherein the first dimension of the first tile, second tile, and third tile are substantially the same, and the second dimension of the first tile, second tile, and third tile are substantially the same, the first tile, second tile, and third tile collectively include a plurality of design zones extending along the first dimension of the respective tile, and the plurality of design zones include a first pair of coordinating design zones, the design zones of the first pair of coordinating design zones each defining a respective edge of the first tile and the second tile, the edge extending in the first direction along the first dimension of the first tile and the second tile, wherein the design zones of the first pair of coordinating design zones have an appearance that differs from one another, and a second pair of coordinating design zones, the design zones of the second pair of coordinating design zones each defining a respective edge of the second tile and the third tile, the edge extending in the first direction along the first dimension of the second tile and the third tile, wherein the second pair of coordinating design zones have an appearance that differs from the first pair of coordinating design zones.

2. The system of claim 1, wherein the first pair of coordinating design zones is for making the first tile and the second tile coordinate with one another, the second pair of coordinating design zones is for making the second tile and the third tile coordinate with one another, and the second tile is for making the first tile and the second tile coordinate with one another.

3. The system of claim 1, wherein the second pair of coordinating design zones includes a first design zone and a second design zone, the first design zone and the second design zone being substantially identical in appearance to one another.

4. The system of claim 1, wherein the second pair of coordinating design zones includes a first design zone and a second design zone, the first design zone and the second design zone differing in appearance from one another.

5. The system of claim 1, wherein the first pair of coordinating design zones includes a first design zone and a second design zone, the first design zone includes a motif and a background, and the second design zone includes a background substantially identical to the background of the first design zone and does not include the motif of the first design zone.

6. The system of claim 1, wherein the first pair of coordinating design zones includes a first design zone and a second design zone, the first design zone includes a design element extending along the first dimension of the respective tile, and the second design zone does not include the design element of the first design zone.

7. The system of claim 6, wherein the design element of the first design zone is an accent stripe.

8. The system of claim 1, arranged to form a textile installation including a plurality of first tiles, a plurality of second tiles, and a plurality of third tiles.

9. The system of claim 1, wherein each design zone has a composition, the composition being at least partially defined by at least one of yarn type, number of distinct yarn types, and tufting specifications, the design zones of the first pair of coordinating design zones have substantially the same composition as one another, and the design zones of the second pair of coordinating design zones have substantially the same composition as one another.

10. The system of claim 9, wherein the design zone of the second tile that has substantially the same composition as the design zone of the first tile is a first design zone of the second tile, the design zone of the second tile that has substantially the same composition as the design zone of the third tile is a second design zone of the second tile, and the first and second design zones of the second tile define opposite edges of the second tile extending in the first direction.

11. The system of claim 10, wherein the composition of the first design zone of the second tile and the composition of the second design zone of the second tile are distinct from one another.

12. The system of claim 1, wherein the plurality of design zones each have second dimension of at least 1 cm.

13. The system of claim 1, formed from a textile web having a length and a width, the textile web comprising:

the plurality of design zones extending along the length of the textile web, each design zone being defined by a plurality of design parameters, the design zones being configured such that a first design zone is for being apportioned between the first tile and the second tile of the plurality of tiles to define the first pair of coordinating design zones, and a second design zone is for being apportioned between the second tile and the third tile of the plurality of tiles to define the second pair of coordinating design zones, wherein the first tile, second tile, and third tile are adjacent to one another across the width of the textile web.

14. The system of claim 13, wherein the first design zone comprises a motif.

15. The system of claim 14, wherein the motif extends substantially across the first design zone.

16. The system of claim 14, wherein the motif extends partially across the first design zone, such that when the first design zone is apportioned between the first tile and the second tile, only the first tile includes the motif.

17. The system of claim 13, further comprising an accent stripe extending along the length of the textile web.

18. The system of claim 1, formed by a method comprising:

providing a textile web having a length and a width, the width of the textile web including a plurality of discrete design zones including a first design zone and a second design zone extending along the length of the textile web; and dividing the textile web into the plurality of tiles including the first tile, the second tile, and the third tile, the first tile, second tile, and third tile being substantially adjacent to one another across the width of the textile web such that the first design zone and the second design zone are each divided into a respective first portion and a respective second portion, with the first tile including the first portion of the first design zone, the second tile including the second portion of the first design zone and the first portion of the second design zone, and the third tile including the second portion of the second design zone, wherein the first portion of the first design zone and the second portion of the first design zone define the first pair of coordinating design zones, and the first portion of the second design zone and the second portion of the second design zone define the second pair of coordinating design zones.

19. A modular textile system, comprising:

a plurality of distinct textile tiles including a first tile, a second tile, and a third tile, the first tile, second tile, and third tile each having a first dimension extending in a first direction and a second dimension extending in a second direction substantially perpendicular to the first direction, wherein the first dimension of the first tile, second tile, and third tile are substantially the same, and the second dimension of the first tile, second tile, and third tile are substantially the same, the first tile, second tile, and third tile collectively include a plurality of design zones extending along the first dimension of the respective tile, the plurality of design zones each having an appearance defined by tufted yarns, and the plurality of design zones include a first pair of coordinating design zones, the design zones of the first pair of coordinating design zones each defining a respective edge of the first tile and the second tile, the edge extending in the first direction along the first dimension of the first tile and the second tile, wherein tufted yarns of the design zones of the first pair of coordinating design zones are configured so that the design zones of the first pair of coordinating design zones have an appearance that differs from one another, and a second pair of coordinating design zones, the design zones of the second pair of coordinating design zones each defining a respective edge of the second tile and the third tile, the edge extending in the first direction along the first dimension of the second tile and the third tile, wherein the tufted yarns of the second pair of coordinating design zones are configured to have an appearance that differs from the first pair of coordinating design zones.

20. The system of claim 19, wherein the first pair of coordinating design zones is for making the first tile and the second tile coordinate with one another, the second pair of coordinating design zones is for making the second tile and the third tile coordinate with one another, and the second tile is for making the first tile and the second tile coordinate with one another.

21. The system of claim 19, wherein the second pair of coordinating design zones includes a first design zone and a second design zone, the tufted yarns of the first design zone and the second design zone being configured so that the first design zone has an appearance that is substantially identical to the appearance of the second design zone.

22. The system of claim 19, wherein the second pair of coordinating design zones includes a first design zone and a second design zone, the tufted yarns of the first design zone and the second design zone being configured so that the first design zone has an appearance that differs from the appearance of the second design zone.

23. The system of claim 19, wherein the first pair of coordinating design zones includes a first design zone and a second design zone, the tufted yarns of the first design zone are configured to include a motif and a background, and the tufted yarns of the second design zone are configured so that the second design zone includes a background substantially identical to the background of the first design zone and does not include the motif of the first design zone.

24. The system of claim 19, wherein the first pair of coordinating design zones includes a first design zone and a second design zone, the tufted yarns of the first design zone are configured to include a design element extending along the first dimension of the respective tile, and the second design zone does not include the design element of the first design zone.

25. The system of claim 24, wherein the design element of the first design zone is an accent stripe.

26. The system of claim 19, arranged to form a textile installation including a plurality of first tiles, a plurality of second tiles, and a plurality of third tiles.

27. The system of claim 19, wherein each design zone has a composition, the composition being at least partially defined by at least one of yarn type, number of distinct yarn types, and tufting specifications, the design zones of the first pair of coordinating design zones have substantially the same composition as one another, and the design zones of the second pair of coordinating design zones have substantially the same composition as one another.

28. The system of claim 27, wherein the design zone of the second tile that has substantially the same composition as the design zone of the first tile is a first design zone of the second tile, the design zone of the second tile that has substantially the same composition as the design zone of the third tile is a second design zone of the second tile, and the first and second design zones of the second tile define opposite edges of the second tile extending in the first direction.

29. The system of claim 28, wherein the composition of the first design zone of the second tile and the composition of the second design zone of the second tile are distinct from one another.

30. The system of claim 19, wherein the plurality of design zones each have a second dimension of at least 1 cm.

31. The system of claim 19, formed from a textile web having a length and a width, the textile web comprising:

the plurality of design zones extending along the length of the textile web, each design zone being defined by a plurality of design parameters, the design zones being configured such that a first design zone is for being apportioned between the first tile and the second tile of the plurality of tiles to define the first pair of coordinating design zones, and a second design zone is for being apportioned between the second tile and the third tile of the plurality of tiles to define the second pair of coordinating design zones, wherein the first tile, second tile, and third tile are adjacent to one another across the width of the textile web.

32. The system of claim 30, wherein the first design zone comprises a motif.

33. The system of claim 32, wherein the motif extends substantially across the first design zone.

34. The system of claim 32, wherein the motif extends partially across the first design zone, such that when the first design zone is apportioned between the first tile and the second tile, only the first tile includes the motif.

35. The system of claim 31, further comprising an accent stripe extending along the length of the textile web.

36. The system of claim 19, formed by a method comprising:

providing a textile web having a length and a width, the width of the textile web including into a plurality of discrete design zones including a first design zone and a second design zone extending along the length of the textile web; and dividing the textile web into the plurality of tiles including the first tile, the second tile, and the third tile, the first tile, second tile, and third tile being substantially adjacent to one another across the width of the textile web such that the first design zone and the second design zone are each divided into a respective first portion and a respective second portion, with the first tile including the first portion of the first design zone, the second tile including the second portion of the first design zone and the first portion of the second design zone, and the third tile including the second portion of the second design zone, wherein the first portion of the first design zone and the second portion of the first design zone define the first pair of coordinating design zones, and the first portion of the second design zone and the second portion of the second design zone define the second pair of coordinating design zones.

* * * * *